(No Model.)
C. E. RICHARDS.
BRACELET.
No. 243,793.  Patented July 5, 1881.
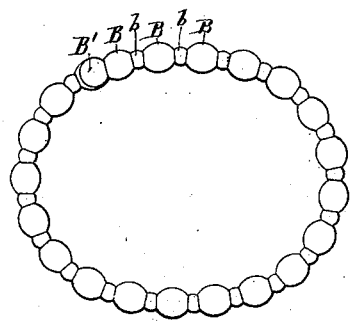
Fig. 1.
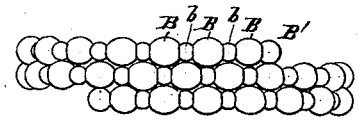
Fig. 2.
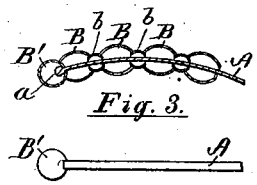
Fig. 3.
Fig. 4.
Witnesses.  
Joseph J. Scholfield.  
Leonard Scholfield.
Inventor.  
Celius E. Richards.